(12) United States Patent
Tamminga et al.

(10) Patent No.: US 11,684,147 B2
(45) Date of Patent: Jun. 27, 2023

(54) ORAL HEALTHCARE PERSONAL APPLIANCE AND BRUSH HEAD WITH INTEGRATED LIGHT GUIDE ALONG A HOLLOW DRIVE AXIS

(71) Applicant: KONINKLIJKE PHILIPS N.V., Eindhoven (NL)

(72) Inventors: Stephanus Jacob Gerardus Tamminga, Groningen (NL); Klaas Kooijker, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 552 days.

(21) Appl. No.: 16/758,921

(22) PCT Filed: Oct. 30, 2018

(86) PCT No.: PCT/EP2018/079706
§ 371 (c)(1),
(2) Date: Apr. 24, 2020

(87) PCT Pub. No.: WO2019/086451
PCT Pub. Date: May 9, 2019

(65) Prior Publication Data
US 2021/0177132 A1 Jun. 17, 2021

Related U.S. Application Data

(60) Provisional application No. 62/580,043, filed on Nov. 1, 2017.

(51) Int. Cl.
*A46B 15/00* (2006.01)
*A46B 5/00* (2006.01)
(Continued)

(52) U.S. Cl.
CPC ........ *A46B 15/0036* (2013.01); *A46B 5/0095* (2013.01); *A46B 13/02* (2013.01); *A61C 17/3418* (2013.01); *A46B 2200/1066* (2013.01)

(58) Field of Classification Search
CPC ............ A46B 15/0034; A46B 15/0036; A46B 15/0016; A46B 5/0095; A46B 13/02;
(Continued)

(56) References Cited

U.S. PATENT DOCUMENTS

| 6,202,242 B1 | 3/2001 | Salmon et al. |
| 6,623,272 B2 | 9/2003 | Clemans |

(Continued)

FOREIGN PATENT DOCUMENTS

| CN | 2375175 Y | 4/2000 |
| CN | 200987469 Y | 12/2007 |

(Continued)

OTHER PUBLICATIONS

International Search Report and Written Opinion, International Application No. PCT/EP2018/079706, dated Feb. 1, 2019.

*Primary Examiner* — Monica S Carter
*Assistant Examiner* — Abbie E Quann

(57) ABSTRACT

An oral healthcare personal appliance (10), configured for use with a removable brush head (20) having a first light guide (28), comprises a handle (16), an actuator (14) with a hollow drive shaft (18), a second light guide (36) disposed co-axially between first and second ends of the hollow drive shaft, a rear stop connection adapter (62) coupled to the second ends of the hollow drive shaft and the second light guide, a light source (66) to emit light into the second light guide, and an optional front stop connection adapter (34) coupled to the first ends of the hollow drive shaft and the second light guide. Physically coupling the brush head to the handle enables both (i) a rotation of the brush head via a rotation of the hollow drive shaft and (ii) a transmission of light from the light source through the second light guide and into the first light guide.

15 Claims, 5 Drawing Sheets

(51) Int. Cl.
*A46B 13/02* (2006.01)
*A61C 17/34* (2006.01)

(58) Field of Classification Search
CPC ........ A46B 15/0077; A46B 2200/1066; F21V 33/004; A61C 17/3418; A61C 17/34; A61C 17/084; A61C 17/32; A61C 17/24; A61C 17/221; A61C 17/222; A61C 17/22; A61C 17/16
See application file for complete search history.

(56) References Cited

U.S. PATENT DOCUMENTS

| | | |
|---|---|---|
| 6,862,771 B1 | 3/2005 | Muller |
| 8,168,963 B2 | 5/2012 | Ratcliffe |
| 2003/0104340 A1 | 6/2003 | Clemans |
| 2004/0210276 A1 | 10/2004 | Altshuler |
| 2009/0083924 A1* | 4/2009 | Shepherd ............ A46B 15/0002 15/105 |
| 2010/0239998 A1 | 9/2010 | Snyder |
| 2013/0203008 A1* | 8/2013 | Kressman ............ A61B 5/0071 433/27 |
| 2014/0259474 A1 | 9/2014 | Sokol |
| 2019/0014901 A1 | 1/2019 | Xi |

FOREIGN PATENT DOCUMENTS

| | | |
|---|---|---|
| CN | 101606783 A | 12/2009 |
| CN | 101683288 A | 3/2010 |
| CN | 106617659 A | 5/2017 |
| CN | 106913058 A | 7/2017 |
| JP | 2010164867 A | 7/2010 |
| JP | 2010213831 A | 9/2010 |

\* cited by examiner dd# ORAL HEALTHCARE PERSONAL APPLIANCE AND BRUSH HEAD WITH INTEGRATED LIGHT GUIDE ALONG A HOLLOW DRIVE AXIS This application is the U.S. National Phase application under 35 U.S.C. § 371 of International Application No. PCT/EP2018/079706, filed on 30 Oct. 2018, which claims the benefit of U.S. Provisional Application No. 62/580,043, filed 1 Nov. 2017. These applications are hereby incorporated by reference herein.

The present embodiments relate generally to oral healthcare personal appliances and more particularly, to an oral healthcare personal appliance or toothbrush with an integrated light guide along a hollow drive axis and a method of making the same.

In the field of oral healthcare, a multitude of reasons exist for wanting to bring light into a user's mouth at the tip of a brush head. One reason is to illuminate an area for inspection. Another reason is to do analysis on reflected light properties. Still other reasons exist. However, to transport the light through an exchangeable or removable brush head, an interface and light path are needed to allow light to travel into, through and out of the removable brush head. In particular, such an interface and light path would be highly desirable for personal care appliances such as an electric toothbrush with a rotatable brush head that rotates about its longitudinal axis. In addition, it would be desirable to have a simple and cost effective interface and light path.

Accordingly, an improved method and apparatus for overcoming the problems in the art is desired.

In accordance with one aspect, an oral healthcare personal appliance is configured for use with a removable brush head, the removable brush head having a first light guide with a light entrance surface exposed to a drive shaft receiver cavity with at least one keying surface in a base of the removable brush head. The appliance comprises a handle that includes a housing, an actuator with a hollow drive shaft, and a second light guide disposed co-axially between first and second ends of the hollow drive shaft. The appliance further comprises a rear stop connection adapter coupled to the second ends of the hollow drive shaft and the second light guide, an optical coupler coupled to a light entrance surface of the second light guide, a light source to emit light into a light input surface of the optical coupler, and a front stop connection adapter coupled to the first ends of the hollow drive shaft and the second light guide.

The actuator is disposed within the housing. The actuator includes the hollow drive shaft having a longitudinal axis, and first and second ends. The first end of the hollow drive shaft extends beyond (i) a first end of the actuator and (ii) outside the housing. In addition, the actuator is operable for imparting a rotation to the hollow drive shaft about the longitudinal axis.

The second light guide includes an optical axis, a light exit surface and a light entrance surface. The second light guide is disposed co-axially, along its optical axis, between the first and second ends of the hollow drive shaft, respectively. In one embodiment, a portion of the second light guide extends beyond the first end of the hollow drive shaft.

The rear stop connection adapter includes an aperture extending therethrough. The aperture includes (i) a first aperture, with an inner radial abutment surface, coupled to the second end of the hollow drive shaft, and (ii) a second aperture, smaller than the first aperture, coupled to the second end of the second light guide. The second aperture operates, at the second end of the hollow drive shaft, to suspend the second light guide co-axially within an interior of the hollow drive shaft.

The optical coupler includes a light input surface and a light exit surface. The optical coupler is disposed within the second aperture of the rear stop connection adapter with the light exit surface optically coupled to the light entrance surface of the second light guide. In addition, the light source is disposed within the housing, and operable to emit light into the light input surface of the optical coupler.

The front stop connection adapter has an aperture extending therethrough. The aperture includes (i) a first aperture, with an inner radial abutment surface, coupled to the first end of the hollow drive shaft, and (ii) a second aperture, smaller than the first aperture, coupled to the first end of the second light guide. The second aperture of the front stop connection adapter operates, at the first end of the hollow drive shaft, to suspend the second light guide co-axially within the interior of the hollow drive shaft. As a result, the second light guide does not directly contact the hollow drive shaft. Instead, the second light guide is separated along a length dimension thereof from the hollow drive shaft via a radial gap.

The front stop connection adapter further includes exterior tip and base portions. The exterior base portion includes at least one keying surface that complements the at least one keying surface of the drive shaft receiver cavity of the base of the brush head. In operation, responsive to physically coupling the removable brush head to the handle via an insertion of the front stop connection adapter within the drive shaft receiver cavity, the at least one keying surface of the exterior base portion mates with the at least one keying surface of the drive shaft receiver cavity to enable both (i) a rotation of the brush head via a rotation of the hollow drive shaft and (ii) a transmission of light from the light source through the second light guide and into the first light guide.

In one embodiment, the optical coupler comprises a collimating lens element. In addition, the light source comprises one selected from the group consisting of a photo-diode, an LED, and a laser. In another embodiment, the light source is physically separated from the optical coupler. In a further embodiment, the light source is physically coupled to the optical coupler.

In another embodiment, the exterior tip portion of the front stop connection adapter is separated from the exterior base portion via an abutment surface that extends perpendicular to a length dimension of the front stop connection adapter. In addition, the abutment surface of the front stop connection adapter establishes a gap spacing between (i) the light exit surface of the second light guide and (ii) the light entrance surface of the first light guide, to enable the transmission of the light from the light source there through.

According to yet another embodiment, the oral healthcare personal appliance further comprises the removable brush head. The removable brush head includes a tip at a first end thereof and a base at a second, opposite end thereof. The base includes the drive shaft receiver cavity with the at least one keying surface. The removable brush head further includes a bristle field proximate the tip, distal from the base. The bristle field includes a plane of bristles extending transverse or perpendicular to a length dimension of the removable brush head.

The removable brush head further includes a first light guide, a mirror element, and a window. The first light guide includes an optical axis, a light exit surface and a light entrance surface and is disposed, along its optical axis, intermediate the first and second ends, respectively, of the removable brush head. The mirror element is disposed within the removable brush head and proximate the light exit surface of the first light guide for reflecting light, exiting via the light exit surface of the first light guide, perpendicular to the optical axis of the first light guide. The window comprises an optically transparent material. The window is disposed within the bristle field, and spaced from the mirror element. Light exiting the light exit surface of the first light guide is reflected by the mirror element through the window. In one embodiment, the first light guide is straight along its optical axis. In another embodiment, the first light guide comprises a polycarbonate light guide.

In yet another embodiment, the removable brush head further comprises at least first and second support ridges configured to suspend the first light guide within the removable brush head along the length dimension thereof. The suspended first light guide contacts the removable brush head at the support ridges alone and is otherwise physically separated from the removable brush head via a radial gap between the first light guide and the removable brush head. In one embodiment, the at least first and second support ridges comprise radial inward extending ridges with a partial rounded or curved cross-sectional shape. In another embodiment, the mirror element comprises one selected from the group consisting of (i) a mirror element fixed to or part of the first light guide, and (ii) a separate mirror element.

According to yet another embodiment, the removable brush head further comprises upper and lower support members. The upper support member includes the base with the drive shaft receiver cavity and the lower support member includes the mirror element. In addition, the at least first and second support ridges comprise a first support ridge, wherein a first half of the first support ridge is disposed on the upper support member, and a second half of the first support ridge is disposed on the lower support member. The second support ridge is disposed within the upper support member at an upper end of the drive shaft receiver cavity within the base of the removable brush head. Still further, the first support ridge is proximate to, but spaced a distance from an end of the first light guide near the light exit surface. The second support ridge is at an opposite end of the first light guide near the light entrance surface. In addition, the second support ridge operates as an end stop for the first light guide.

According to another embodiment, a method of making an oral healthcare personal appliance configured for use with a removable brush head, the removable brush head having a first light guide with a light entrance surface exposed to a drive shaft receiver cavity with at least one keying surface in a base of the removable brush head, comprises providing a handle that includes a housing, and providing an actuator disposed within the housing. The actuator includes a hollow drive shaft with a longitudinal axis, the hollow drive shaft having first and second ends. In one embodiment, the first end of the hollow drive shaft extends beyond (i) a first end of the actuator and (ii) outside the housing. The actuator is operable for imparting a rotation to the hollow drive shaft about the longitudinal axis.

In addition, the method comprises providing a second light guide having an optical axis, a light exit surface and a light entrance surface. The second light guide is disposed co-axially, along its optical axis, between the first and second ends of the hollow drive shaft, respectively. In one embodiment, a portion of the second light guide extends beyond the first end of the hollow drive shaft. The method further comprises providing a rear stop connection adapter having an aperture extending therethrough, the aperture including (i) a first aperture, with an inner radial abutment surface, coupled to the second end of the hollow drive shaft, and (ii) a second aperture, smaller than the first aperture, coupled to the second end of the second light guide. The second aperture of the rear stop connection adapter operates, at the second end of the hollow drive shaft, to suspend the second light guide co-axially within an interior of the hollow drive shaft.

The method still further comprises providing an optical coupler having a light input surface and a light exit surface. The optical coupler is disposed within the second aperture of the rear stop connection adapter with the light exit surface optically coupled to the light entrance surface of the second light guide. In addition, the method includes providing a light source disposed within the housing. The light source is configured to emit light into the light input surface of the optical coupler.

Yet still further, the method comprises providing a front stop connection adapter having an aperture extending therethrough, the aperture including (i) a first aperture, with an inner radial abutment surface, coupled to the first end of the hollow drive shaft, and (ii) a second aperture, smaller than the first aperture, coupled to the first end of the second light guide. The second aperture of the front stop connection adapter operates, at the first end of the hollow drive shaft, to suspend the second light guide co-axially within the interior of the hollow drive shaft. The second light guide does not directly contact the hollow drive shaft and is separated along a length dimension thereof from the hollow drive shaft via a radial gap. The front stop connection adapter further comprises exterior tip and base portions. The exterior base portion includes at least one keying surface that complements the at least one keying surface of the drive shaft receiver cavity of the base of the brush head. In operation, responsive to physically coupling the removable brush head to the handle via an insertion of the front stop connection adapter within the drive shaft receiver cavity, the at least one keying surface of the exterior base portion mates with the at least one keying surface of the drive shaft receiver cavity to enable both (i) a rotation of the brush head via a rotation of the hollow drive shaft and (ii) a transmission of light from the light source through the second light guide and into the first light guide.

In another embodiment of the method, the step of providing the front stop connection adapter further includes separating the exterior tip portion of the front stop connection adapter from the exterior base portion via an abutment surface that extends perpendicular to a length dimension of the front stop connection adapter. In addition, the abutment surface of the front stop connection adapter establishes a gap spacing between (i) the light exit surface of the second light guide and (ii) the light entrance surface of the first light guide, to enable the transmission of the light from the light source there through.

According to still another embodiment, the method further comprises providing the removable brush head, wherein the removable brush head comprises a tip at a first end thereof and a base at a second, opposite end thereof. The base includes the drive shaft receiver cavity with the at least one keying surface. The removable brush head further comprises a bristle field proximate the tip, distal from the base, the bristle field including a plane of bristles extending transverse or perpendicular to a length dimension of the removable brush head. In addition, the method includes providing the first light guide, wherein the first light guide includes an optical axis, a light exit surface and a light entrance surface and being disposed, along its optical axis, intermediate the first and second ends, respectively, of the removable brush head. The method further includes providing a mirror element and a window. The mirror element is disposed within the removable brush head, proximate the light exit surface of the first light guide for reflecting light, exiting via the light exit surface of the first light guide, perpendicular to the optical axis of the first light guide. The window comprises an optically transparent material, and is disposed within the bristle field, and spaced from the mirror element. Light exiting the light exit surface of the first light guide is reflected by the mirror element through the window.

In yet another method embodiment, the step of providing the removable brush head further comprises providing at least first and second support ridges configured to suspend the first light guide within the removable brush head along the length dimension thereof. The suspended first light guide contacts the removable brush head at the support ridges alone and is otherwise physically separated from the removable brush head via a radial gap between the first light guide and the removable brush head.

In a still further method embodiment, the step of providing the removable brush head further comprises providing upper and lower support members. The upper support member includes the base with the drive shaft receiver cavity and the lower support member includes the mirror element. In addition, the at least first and second support ridges comprise a first support ridge, wherein a first half of the first support ridge is disposed on the upper support member, and a second half of the first support ridge is disposed on the lower support member. Furthermore, the second support ridge is disposed within the upper support member at an upper end of the drive shaft receiver cavity within the base of the removable brush head. Still further, the first support ridge is proximate to, but spaced a distance from an end of the first light guide near the light exit surface. The second support ridge is at an opposite end of the first light guide near the light entrance surface. In addition, the second support ridge operates as an end stop for the first light guide.

The embodiments of the present disclosure advantageously provide a handle-to-brush head, light guide interface that overcomes problems in the art.

Still further advantages and benefits will become apparent to those of ordinary skill in the art upon reading and understanding the following detailed description.

BRIEF DESCRIPTION OF THE DRAWINGS

The embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

Figure 1:
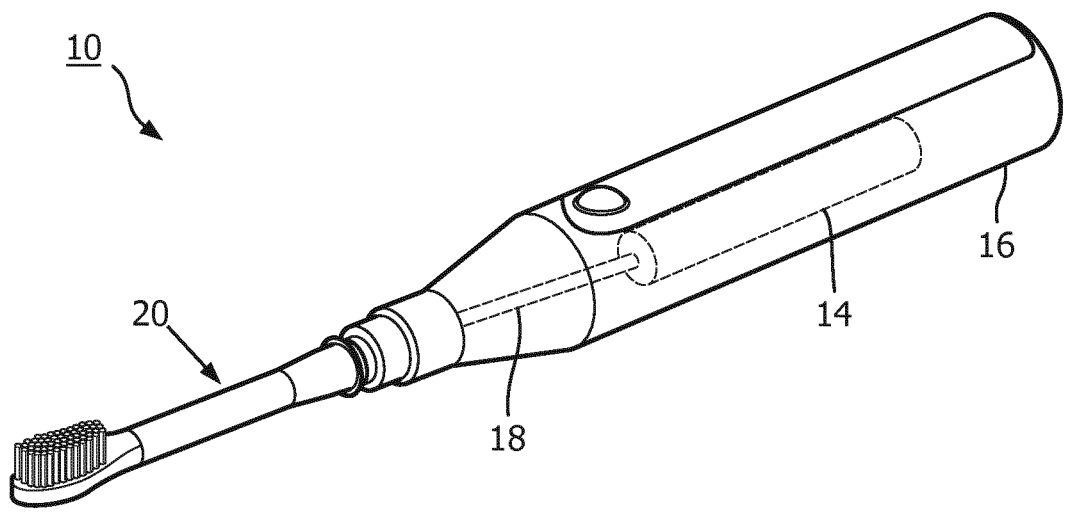
FIG. 1 is a perspective view of a personal care appliance configured for use with a removable brush head having an integrated light guide, the personal care appliance including an actuator with a hollow drive shaft and a co-axially disposed second light guide, according to an embodiment of the present disclosure.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein can be used in the practice or testing of the embodiments.

As will be understood from the disclosure herein, a personal care appliance, or toothbrush, is constructed in which a light guide transports light from the body of the toothbrush towards a brush head, through a drive axis of an actuator. In addition, the brush head includes an integrated light guide that is constructed in a manner which brings light from the drive axis to the bristle field. The brush head is used in combination with the body of the toothbrush having a light guide interface, preferably in the center of the drive axis.

With respect to optical fibers or light guides as used herein, it is recognized that optical fibers are complex and relatively expensive to integrate. In the embodiments of the present disclosure, the light guides preferably comprise polycarbonate (PC) light guides. Polycarbonate provides a desired best performance and at low cost. In other embodiments, the light guides may comprise other suitable materials. For example, more expensive materials can have better optical qualities, however, they may also be less desirable in that they are often very hard to process or very fragile, like quartz. In addition, the design according to the embodiments of the present disclosure advantageously offers a simple design capable of transporting light from the base of the brush head to the teeth or gum.

In one type of powered toothbrush, the brush heads of the toothbrush are rotating around the longitudinal axis. This means that any handle-to-brush head interface needs to (i) allow this rotation, or (ii) rotate with it. As will understood from the disclosure herein, the embodiments of the present disclosure advantageously solve this issue by placing the light path in the center of rotation, i.e., using a hollow drive axis in which a light guide is placed.

The inventors have recognized that to minimize losses in reflections, a light guide should be surrounded by air as much as possible. This means that the light guide needs to be suspended inside the brush head, as well as inside the hollow drive shaft, supported at a minimum number of locations. Also, in one embodiment, the light needs to exit the brush head, from within the brush field, under a 90 degree angle. For other purposes or embodiments, this may be different. In one embodiment, the brush head is divided into a number of parts, as will be discussed further herein. Note that parts may also be combined, e.g., in a production brush head, to minimize a total number thereof.

With reference now to FIG. 1, a perspective view of a personal care appliance 10 configured for use with a removable brush head 20 having an integrated light guide, according to an embodiment of the present disclosure, is illustrated. The personal care appliance 10 comprises a drive system, including an actuator 14 with a hollow drive shaft 18 and a co-axially disposed second light guide. In one embodiment, the personal care appliance 10 comprises an electronic toothbrush with a brush head. The actuator 14 is generally disposed within a handle 16 of the personal care appliance 10. The actuator 14 drives the hollow drive shaft, on which is mounted a removable brush head 20.

Figure 2:
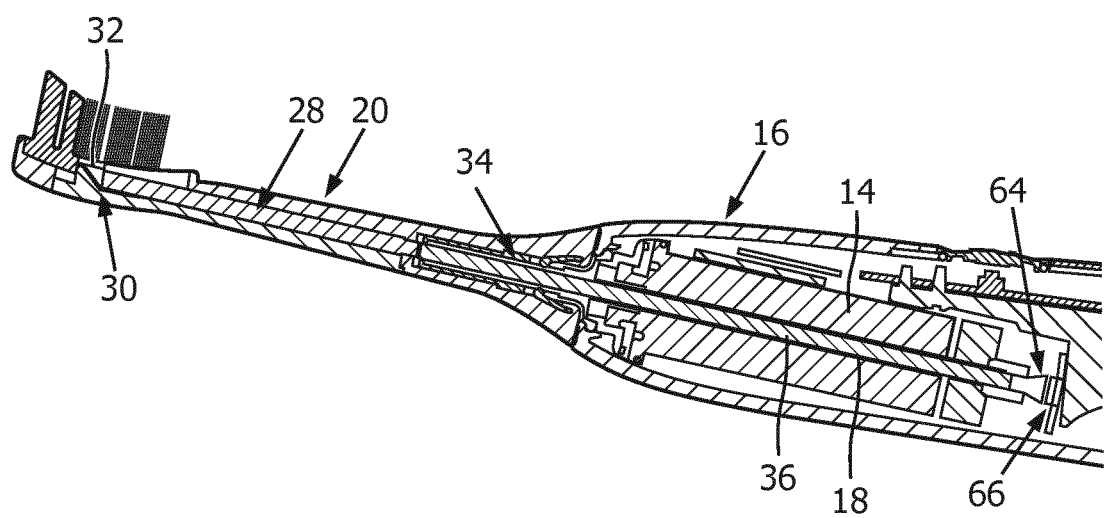
FIG. 2 is a partial cross-sectional view of the personal care appliance according to an embodiment of the present disclosure.

Turning now to FIG. 2, a partial cross-sectional view of the personal care appliance 10 of FIG. 1 is shown in greater detail. Brush head 20 includes a first light guide 28 disposed along a length dimension thereof, a mirror or mirror element 30, and a window 32 disposed between the mirror 30 and the bristles. In addition, brush head 20 may be coupled to the handle 16, via a front stop connection adapter 34, as will be discussed further herein with reference to FIG. 8. Actuator 14, which is disposed within handle 16, includes a hollow drive shaft 18 (FIG. 3) and a second light guide 36 disposed co-axially, along its optical axis, within the hollow drive shaft. Also identified in FIG. 2 are an optical coupler 64 and light source 66, as will be discussed further herein below.

Figure 3:
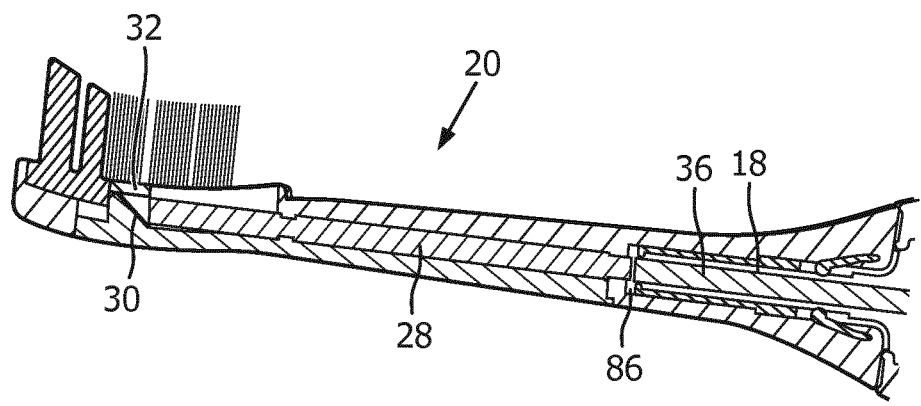
FIG. 3 is a cross-sectional view of the removable brush head with integrated light guide for use with the personal care appliance according to an embodiment of the present disclosure.

With reference now to FIG. 3, there is shown a cross-sectional view of the removable brush head 20 with integrated light guide for use with the personal care appliance 10 according to one embodiment of the present disclosure.

The removable brush head 20 further includes a first light guide 28, a mirror element 30, and a window 32. The first light guide 28 includes an optical axis, a light exit surface 28b, and a light entrance surface 28a and is disposed, along the length axis of the removable brush head 20. The mirror element 30 is disposed within the removable brush head 20 and proximate the light exit surface of the first light guide 28 for reflecting light, exiting via the light exit surface of the first light guide, perpendicular to the optical axis of the first light guide. The window 32, comprising an optically transparent material, is disposed within or beneath the bristles and spaced from the mirror element 30. Light exiting the light exit surface of the first light guide 28 is reflected by the mirror element 30 through the window 32. In one embodiment, the first light guide 28 is straight along its optical axis. In another embodiment, the first light guide 28 comprises a polycarbonate light guide.

In one embodiment, the mirror element 30 comprises polished stainless steel. Using a polished stainless steel element is advantageous due to its manufacturing simplicity and cost. Depending on the intended purpose of the illumination from the personal care appliance, other embodiments of mirror element are possible. For example, the mirror element 30 may comprise a mirror surface created in the first light guide 28 itself. The mirror surface can be created by cutting a faceted corner (e.g., 45 degrees) off the end of the first light guide and coating an outside surface of the faceted corner with a highly reflective coating. In other words, the mirror element 30 can comprise (i) a mirror element fixed to or part of the first light guide 28, and/or (ii) a separate mirror element.

In one embodiment, the window 32 comprises a material of given optical transmission characteristics suitable for the intended brush head application. The window 32 is located within the brush head 20 in an area above the mirror element 30 in the brush head. The window 32 seals and protects the mirror element 30 and the light exit surface of the first light guide 28 from liquids, debris, and toothpaste when the oral healthcare appliance or toothbrush is in use. The window 32 preferably comprises polycarbonate. The use of other suitable optically transparent materials is also possible.

Figure 4:
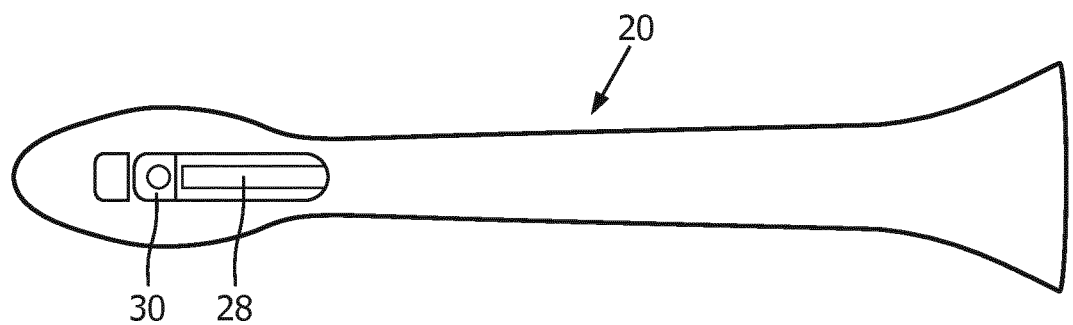
FIG. 4 is a top view showing a first light guide and mirror of the removable brush head with integrated light guide for use with the personal care appliance according to an embodiment of the present disclosure.

FIG. 4 is a top view showing the first light guide 28 and the mirror element 30 of the removable brush head 20 with integrated light guide. The mirror element 30 is separate from the first light guide 28.

Figure 5:
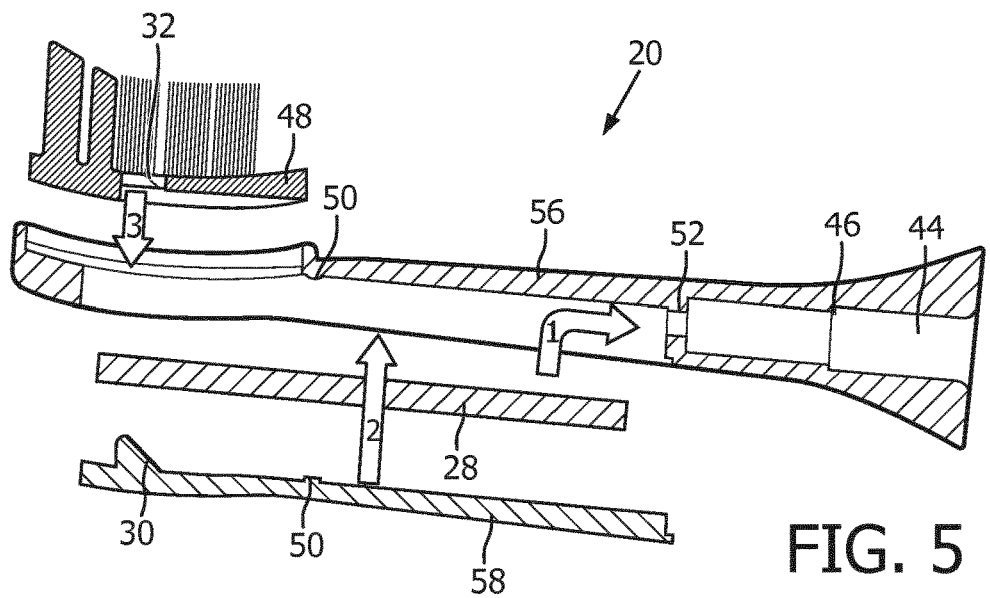
FIG. 5 is an exploded cross-sectional view of the removable brush head with integrated light guide for use with the personal care appliance according to an embodiment of the present disclosure.

With reference now to FIG. 5, an exploded cross-sectional view of the removable brush head 22 with integrated light guide for use with the personal care appliance 10 is shown. In one embodiment, the removable brush head 20 further comprises upper and lower support members, 56 and 58, respectively. The upper support member 56 includes the drive shaft receiver cavity 44, with the at least one keying surface 46. The lower support member 58 includes the mirror element 30. In addition, the at least upper and lower support members, 56 and 58, each have a portion of a first support ridge 50, wherein a first portion of the first support ridge 50 is disposed on the upper support member 56, and a second portion of the first support ridge 50 is disposed on the lower support member 58 at a position that coincides with the position of the first portion of the first support ridge. The first support ridge 50 is proximate to, but excluding at the very end of the first light guide 28 at the light exit surface. A second support ridge 52 is disposed within the upper support member 56 at an upper end of the drive shaft receiver cavity 44. In addition, the second support ridge 52 operates as an end stop for the first light guide 28.

Figure 6A:
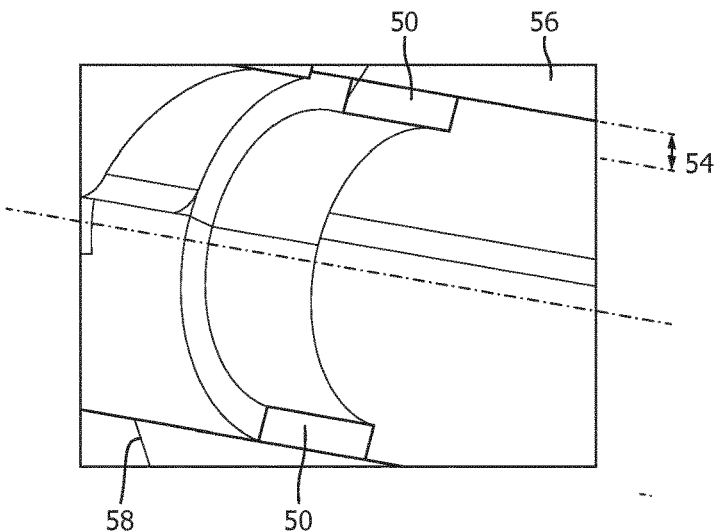
FIG. 6A is a cross-sectional view of a light guide support ridge, having flat surfaces, of the removable brush head with integrated light guide according to an embodiment of the present disclosure.
Figure 6B:
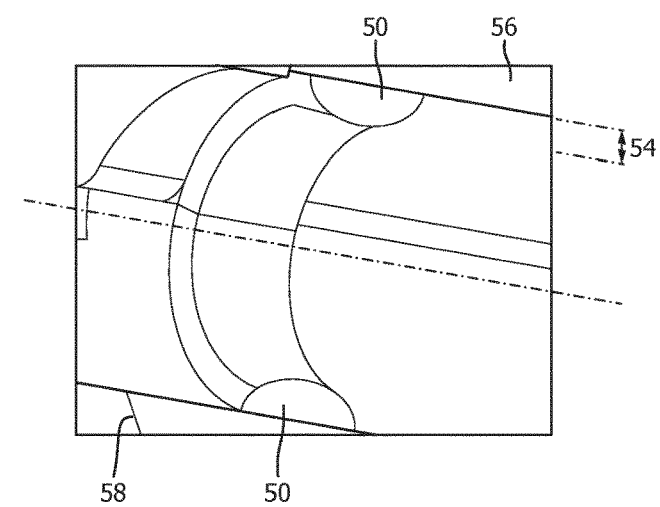
FIG. 6B is a cross-sectional view of a light guide support ridge, having a curved surface, of the removable brush head with integrated light guide according to another embodiment of the present disclosure.

When assembled, in one embodiment, the securing connection provided by each of the support ridges, 50 and 52, makes a continuous 360 degree contact with the exterior surface of the first light guide 28. However, other support connections, or variations, e.g., an intermittent 360 degree support contact, are also possible. In the illustrated embodiment of FIG. 5, each of the supporting ridges, 50 and 52, extends for 360 degrees about a circumference of the light guide at a respective support position along the longitudinal axis of the light guide. In a preferred embodiment, each support ridge comprises a curved, inwardly extending, ridge portion or part on the inside wall of the brush head upper and lower support members or elements, as shown in FIGS. 6A and 6B. The curved ridge would have minimal contact on a microscopic level, which would lead to the least optical losses.

The first and second support ridges, 50 and 52, are configured to suspend the first light guide within the removable brush head along the length dimension thereof. The suspended first light guide 28 contacts the removable brush head 20 at the support ridges alone and is otherwise physically separated from the removable brush head via a radial gap 54 between the first light guide 28 and the removable brush head 20. In one embodiment, the at least first and second support ridges, 50 and 52, respectively, comprise radial inward extending ridges with a partial rounded or curved cross-sectional shape (FIG. 6B).

In addition, the first and second support ridges, 50 and 52, respectively, may comprise different cross-sectional shapes, determined according to the particular requirements of a given brush head. For example, FIG. 6A is a cross-sectional view of a light guide support ridge, having flat surfaces, according to one embodiment. FIG. 6B is a cross-sectional view of a light guide support ridge, having a curved surface, according to another embodiment of the present disclosure.

With respect to the embodiment as shown in FIG. 5, the support ridges (50,52) of the upper support member 56 of the brush head provide at least one contact area with respect to each end of the first light guide 28. During assembly, the first light guide 28 is placed into the upper support member 56. The lower support member 58 also provides at least one contact area for the first light guide. The brush head 20 includes a window 32 placed with respect to a location of the mirror element 30 for enabling light, which emanates from the first light guide 28, to exit the brush head 20. Variations in ways to combine and/or subdivide these elements may also be possible.

In one embodiment, the first light guide 28 is placed into the upper support member 56, before the lower support member 58 or back cover is attached. The proximal end of the first light guide 28 is press fit within the base portion of the upper support member 56. The various component parts are able to deform slightly, so a tight fit can be used. The exact fit depends on the choice of materials for the various components.

Figure 7:
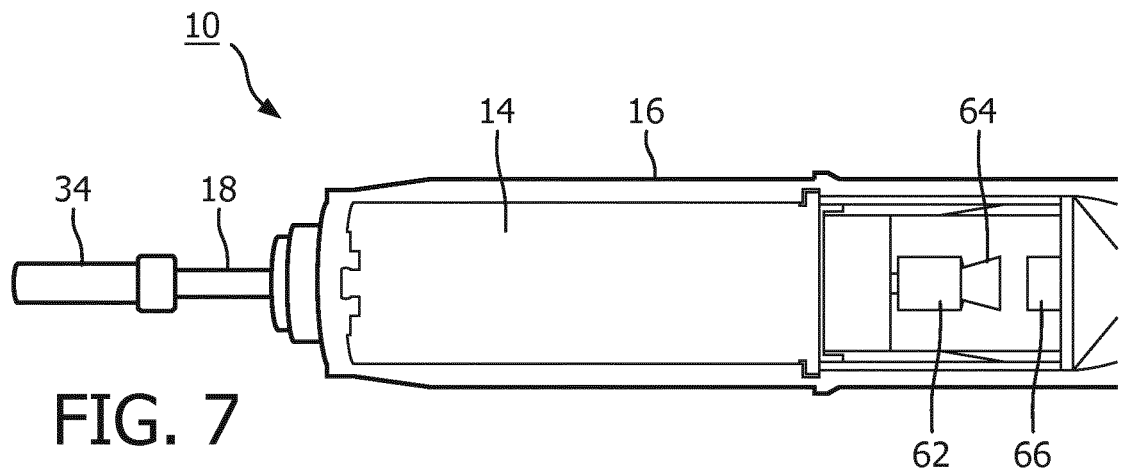
FIG. 7 is a top, partial cut-away, image view of a personal care appliance including an actuator with a hollow drive shaft and a co-axially disposed second light guide according to an embodiment of the present disclosure.

Referring now to FIG. 7, there is shown a top, partial cut-away, image view ew of the personal care appliance 10 including an actuator 14 with a hollow drive shaft 18. The hollow drive shaft contains a second light guide 36 disposed co-axially between first and second ends of the hollow drive shaft, as shown in FIG. 2. The first end of the hollow drive shaft 18 extends beyond (i) a first end of the actuator 14 and (ii) outside the handle 16. In addition, the actuator 14 is operable for imparting a rotation to the hollow drive shaft 18 about the longitudinal axis of the drive shaft. The appliance 10 further comprises a rear stop connection adapter 62 coupled to the second end of the hollow drive shaft 18 and the second light guide 36, an optical coupler 64 coupled to a light entrance surface of the second light guide 36, a light source 66 to emit light into a light input surface of the optical coupler 64, and a front stop connection adapter 34 coupled to the first end of the hollow drive shaft 18 and the second light guide 36.

As will be understood from the discussion herein, a core feature of the embodiments of the present disclosure is the use of a hollow axis in the drive train. The drive train is also adapted, as appropriate, to retain suitable drive train rotational operating characteristics. Inside the hollow drive shaft, a light guide is located and held in its place by end stops. In one embodiment, at a back end of the hollow drive shaft 18, which extends out from a back end of the actuator 14, light from the light source 66 can be brought into the light guide 36.

The light source 66 can be placed with respect to the light guide 36 in one of two ways. In a first way, as shown in FIG. 2, the light source 66 is physically coupled onto the light guide 36 or optical coupler 64. In such an embodiment, the physical coupling provides a best execution in terms of efficiency. However, such an embodiment would mean that the light source 66 rotates with the drive shaft 18 and thus the electrical connections to the light source would need to be flexible enough to allow the rotation and durable enough to last the lifetime of the product.

In a second way, the light source 66 is located a small distance from the rear of the light guide 36 (and/or optical coupler 64, e.g., a collimating lens), as shown in FIG. 7. This latter embodiment advantageously places the light source 66 on the static part of the brush handle 16, which makes the corresponding construction thereof more reliable. In addition, the distance between light source 66 and light guide 36 (and/or optical coupler 64) should be large enough to allow the light source to survive a top-down drop test, but not larger, so as to maximize a corresponding light coupling efficiency.

Figure 9:
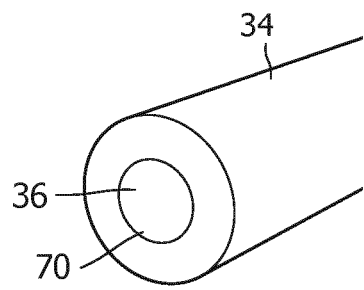
FIG. 9 is a perspective view of a tip of the front stop connection adapter for the hollow drive shaft and second light guide of the personal care appliance according to an embodiment of the present disclosure.
Figure 10:
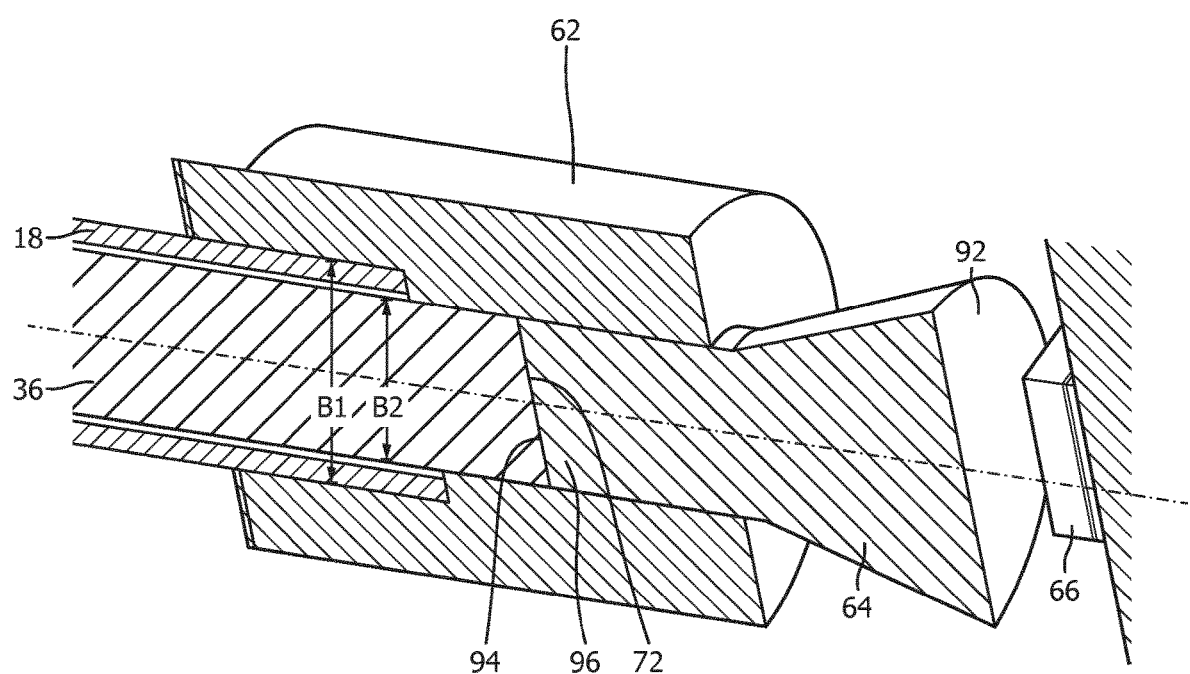
FIG. 10 is a cross-sectional view of a rear stop connection adapter for the hollow drive shaft and second light guide, an optical coupler, and a light source of the personal care appliance according to an embodiment of the present disclosure.

As discussed earlier herein, to minimize losses in reflections, a light guide should be surrounded by air as much as possible. According to the embodiments of the present disclosure, a light guide 36 forms an inner core of the hollow drive shaft 18, with a gap between the light guide and the inner wall of the hollow drive shaft. To keep the light guide 36 in place within the hollow drive shaft 18, the light guide is held therein by connection adapters or spacers at both ends, as illustrated in FIGS. 8-10 and discussed below.

Figure 8:
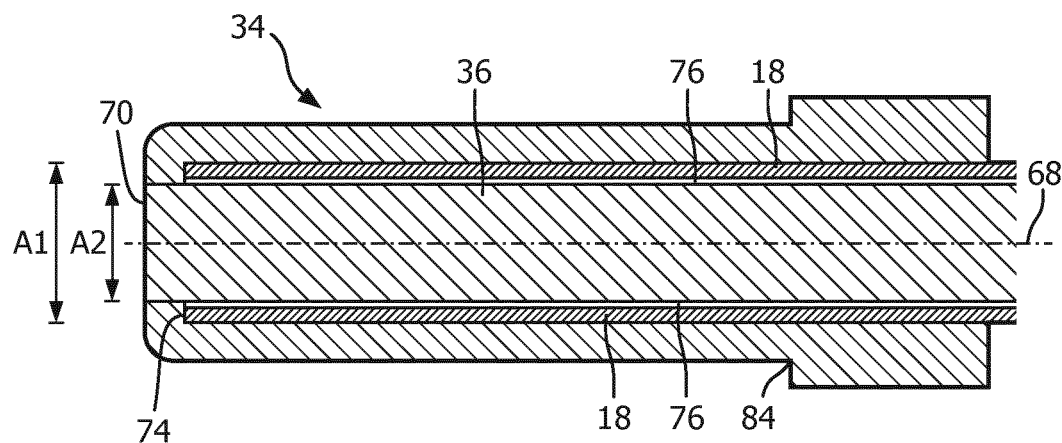
FIG. 8 is a cross-sectional view of a front stop connection adapter for the hollow drive shaft and second light guide of the personal care appliance according to an embodiment of the present disclosure.

FIG. 8 shows a cross-sectional view of a front stop connection adapter 34 for the hollow drive shaft 18 and second light guide 36. The second light guide 36 includes an optical axis 68, a light exit surface 70 and a light entrance surface 72 (FIG. 10). The second light guide 36 is disposed co-axially, along its optical axis, between the first and second ends of the hollow drive shaft 18, respectively. In one embodiment, a portion of the second light guide 36 extends beyond the first end of the hollow drive shaft 18 (FIG. 8).

The front stop connection adapter 34 has an aperture extending therethrough. The aperture includes (i) a first aperture A1, with an inner radial abutment surface 74, coupled to the first end of the hollow drive shaft 18, and (ii) a second aperture A2, smaller than the first aperture, coupled to the first end of the second light guide 36. The second aperture A2 of the front stop connection adapter 34 operates, at the first end of the hollow drive shaft 18, to suspend the second light guide 36 co-axially within the interior of the hollow drive shaft. As a result, the second light guide 36 does not directly contact the hollow drive shaft 18. Instead, the second light guide 36 is separated along a length dimension thereof from the hollow drive shaft 18 via a radial gap 76.

As shown in FIG. 8, the front stop connection adapter 34 further includes at least one keying surface 84 that complements the at least one keying surface 46 of the drive shaft receiver cavity 44 of the brush head 20 (FIG. 5). In operation, responsive to physically coupling the removable brush head 20 to the handle 16 via an insertion of the front stop connection adapter 34 within the drive shaft receiver cavity 44, the at least one keying surface 84 mates with the at least one keying surface 46 of the drive shaft receiver cavity 44 (FIG. 5) to enable both (i) a rotation of the brush head via a rotation of the hollow drive shaft and (ii) a transmission of light from the light source 66 through the second light guide 36 and into the first light guide 28. Note that the specific cross-sectional shapes of the connection adapters are not a requirement, as long as there is at least one flat side, or feature, configured for use as a keying surface 84 with a keying surface 46 of the receiver cavity 44 in the brush head 20. In another embodiment, keying surface 84 is an abutment surface 84 that extends perpendicular to a length dimension of the front stop connection adapter, as shown in FIG. 8. In addition, the abutment keying surface 84 of the front stop connection adapter is used for establishing a gap spacing 86 (as shown in FIG. 2) between (i) the light exit surface of the second light guide 36 and (ii) the light entrance surface of the first light guide 28, to enable the transmission of the light from the light source 66 therethrough. The air gap 86 may assist to prevent any damage to the respective light guides during mounting of the brush head 20 to the handle 16, and/or during use, especially since the drive shaft is typically able to move in the axial direction within a given amount of tolerance. However, the presence of an air gap may not be a functional requirement. In one embodiment, the air gap is on the order of a few millimeters; however, larger gaps may be possible, depending on an effectiveness of the light guidance before this point. The straighter the path can be designed, the larger the gap can be crossed. For instance, the gap may include a spacing of up to approximately 1 cm, or more. Preferably, the light guides are optically aligned with one another across the gap. For any given implementation, the efficiency of optical transmission reduces with the ratio of matching surfaces. Acceptable losses are dependent upon the required optical signal for a given toothbrush implementation.

To assist in further understanding of the present embodiments, FIG. 9 shows a perspective view the front stop connection adapter 34 for the hollow drive shaft and at the end of the light exit surface (70) of second light guide (36) of the personal care appliance 10.

With reference now to FIG. 10, a cross-sectional view of a rear stop connection adapter 62 for the hollow drive shaft 18 and second light guide 36, an optical coupler 64, and a light source 66 of the personal care appliance 10 is shown. The rear stop connection adapter 62 includes an aperture extending therethrough. The aperture includes (i) a first aperture B1 coupled to the second end of the hollow drive shaft 18, and (ii) a second aperture B2, smaller than the first aperture B1, coupled to the second end of the second light guide 36. The second aperture B2 operates, at the second end of the hollow drive shaft 18, to suspend the second light guide 36 co-axially within an interior of the hollow drive shaft 18. The optical coupler 64 includes a light input surface 92 and a light exit surface 94. The optical coupler 64 is disposed within the second aperture B2 of the rear stop connection adapter 62 with the light exit surface optically coupled to the light entrance surface of the second light guide 36. In addition, the light source 66 is disposed within the handle 16, and operable to emit light into the light input surface 92 of the optical coupler 64.

In one embodiment, the optical coupler 64 comprises a collimating lens element. In another embodiment, the light source 66 comprises a light source selected from among a photodiode, an LED, a laser, or other suitable light source. In yet another embodiment, the light source 66 is physically separated from the optical coupler 64. In a further embodiment, the light source 66 is physically coupled to the optical coupler (not shown).

Referring still to FIG. 10, at the proximal end of the second light guide 36 within the hollow drive shaft 18, the optical coupler 64 is shown as a funnel shaped optical interface member and is coupled to the rear stop connection adapter 62 or end stop. In one embodiment, the optical coupler or interface member comprises a collimating lens. In addition, as illustrated and discussed, end stops, such as front and rear stop connection adapters, respectively, are used to secure the second light guide 36 within the hollow drive shaft 18 at both ends thereof.

In one embodiment, the rear stop connection adapter 62 is coupled to the hollow drive shaft 18 and second light guide 36 via the aperture in the rear stop connection adapter. That is, the rear stop connection adapter is slid over the end of the hollow drive shaft, via the first aperture B1, and over the second light guide, via the second aperture B2 which provides a tighter fitted coupling portion to hold the end of the second light guide. In this embodiment, the end of the second light guide 36 is extending outside, beyond an end of the drive shaft 18; however, other embodiments may include the second light guide not extending beyond an end of the drive shaft.

In addition, given that the second light guide 36 is produced more easily and less expensively as a single straight part, the optical coupler 64 or collimating lens is a separate part from the second light guide. As shown in FIG. 10, the optical coupler 64 is inserted within the aperture of the rear stop connection adapter 62 separately. In one embodiment, the optical coupler 64 or collimating lens is glued, for example, to the second light guide 36, at an optical interface 96 between the same, using an optical glue to ensure optimal transmission. In another embodiment no glue is used; however, an air gap may be present at the interface 96 between the collimating lens 64 and second light guide 36.

Other variations to the embodiments specifically shown in the Figures are possible. For example, while the hollow drive shaft is illustrated as having first and second ends extending beyond each of first and second ends of the actuator, respectively, the extension to the rear might not be 100% necessary. That is, the optical coupler could be inserted right at the end of the actuator, which would mean that the rear portion of the hollow drive shaft does not extend beyond the actuator. In addition, with respect to the portion of the second light guide that extends beyond each of the first and second ends of the hollow drive shaft, such an extension of the light guide beyond an end of the hollow drive shaft might not be necessary and could be avoided with suitable changes in the connection adapters.

In addition, the illustrated embodiments can accommodate both sending of light and receiving of reflected light signals through the second light guide of the device. In order to accommodate both a light source and a light receiver in the optical path of the device, the optical coupler/lens is included. The optical coupler/lens may also be included when conditions are sub-optimal, such that the optical coupler/lens provides a way to get more light from the light source into the second light guide. However, in an application used only to send light through the second light guide (i.e., for illumination purposes only, or with a receiver in a different location), then the optical coupler/lens might not be needed, since a sensor or light receiver would not be next to the light source, and the light source can be placed directly on the optical axis of the second light guide.

Although only a few exemplary embodiments have been described in detail above, those skilled in the art will readily appreciate that many modifications are possible in the exemplary embodiments without materially departing from the novel teachings and advantages of the embodiments of the present disclosure. For example, the embodiments of the present disclosure may be advantageously used in power shaver applications. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements, and/or by means of a suitably programmed computer. In a device claim enumerating several means, several of these means may be embodied by one and the same item of hardware. The mere fact that certain measures are recited in mutually different dependent claims does not indicate that a combination of these measures cannot be used to an advantage.

The invention claimed is:

1. A personal care appliance comprising: a handle; an actuator operable for imparting a rotation along a longitudinal axis to a hollow drive shaft having first and second ends; a removable brush head having bristles, the removable brush head having a first light guide disposed along a length dimension thereof having a light entrance surface and a light exit surface, a mirror element and a window disposed between the mirror and the bristles wherein light exiting the light exit surface of the first light guide is reflected by the mirror through the window toward the bristles; a second light guide disposed between the first and the second ends of the hollow drive shaft, respectively, wherein a portion of the second light guide extends beyond the first end of the hollow drive shaft; a rear stop connection adapter coupled to the second end of the hollow drive shaft and the second light guide; an optical coupler coupled to a light entrance surface of the second light guide; and a light source configured to emit light into a light input surface of the optical coupler.

2. The appliance according to claim 1, wherein the light source comprises one selected from the group consisting of a photodiode, an LED, and a laser.

3. The appliance according to claim 1, wherein the optical coupler comprises a collimating lens element.

4. The appliance according to claim 1, wherein the light source is physically separated from the optical coupler.

5. The appliance according to claim 1, wherein the light source is physically coupled to the optical coupler.

6. The appliance according to claim 1, wherein the removable brush head further comprises upper and lower support members, wherein the upper support member includes a drive shaft receiver cavity with at least one keying surface, and wherein the lower support member includes the mirror element.

7. The appliance according to claim 6, the removable brush head further comprising: at least first and second support ridges, wherein a first portion of the first support ridge is disposed on the upper support member, and a second portion of the first support ridge is disposed on the lower support member, and wherein the second support ridge is disposed within the upper support member at an upper end of the drive shaft receiver cavity.

8. The appliance according to claim 1, wherein the first light guide is straight along its optical axis.

9. The appliance according to claim 1, wherein the first light guide comprises a polycarbonate light guide.

10. The appliance according to claim 7, wherein the at least first and second support ridges are configured to suspend the first light guide within the removable brush head along the length dimension thereof, wherein the first light guide contacts the removable brush head at the support ridges alone and is otherwise physically separated from the removable brush head via a radial gap between the first light guide and the removable brush head.

11. The appliance according to claim 10, further wherein the at least first and second support ridges comprise radial inward extending ridges with a partial rounded cross-sectional shape.

12. The appliance according to claim 1, further comprising a front stop connection adapter having at least one keying surface, the front stop connection adapter having an aperture extending there through, coupled to the first end of the hollow drive shaft and the second light guide, to enable both (i) a rotation of the brush head via a rotation of the hollow drive shaft and (ii) a transmission of light from the light source through the second light guide and into the first light guide in the removable brush head.

13. The appliance according to claim 12, wherein the removable brush head further comprises upper and lower support members, wherein the upper support member includes a drive shaft receiver cavity with at least one keying surface that complements and mates with the at least one keying surface of the front stop connection adapter.

14. The appliance according to claim 1, wherein the optical coupler includes the light input surface and a light exit surface.

15. The appliance according to claim 14, wherein a first support ridge is proximate to, but spaced a distance from an end of the first light guide near the light exit surface, and wherein a second support ridge is at an opposite end of the first light guide near the light entrance surface, wherein further the second support ridge operates as an end stop for the first light guide.

\* \* \* \* \*